No. 654,935. Patented July 31, 1900.
B. C. BATCHELLER.
PLANING MACHINE.
(Application filed Dec. 24, 1898.)

(No Model.) 2 Sheets—Sheet 1.

Witnesses: Henry Drury

Inventor: Birney C. Batcheller
by his atty.
Francis T. Chambers

No. 654,935. Patented July 31, 1900.
B. C. BATCHELLER.
PLANING MACHINE.
(Application filed Dec. 24, 1898.)
(No Model.) 2 Sheets—Sheet 2.
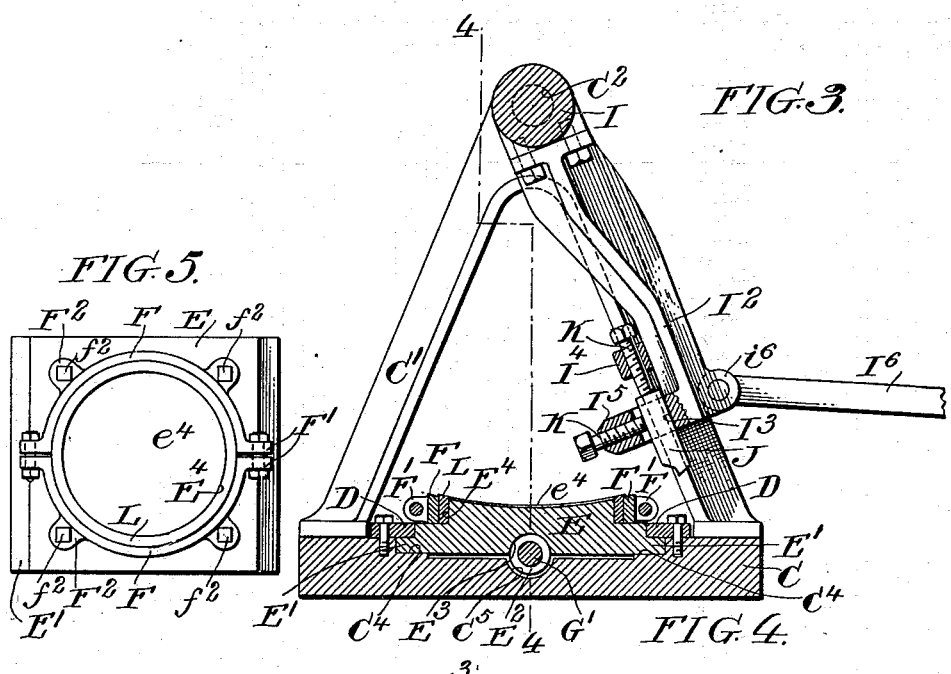
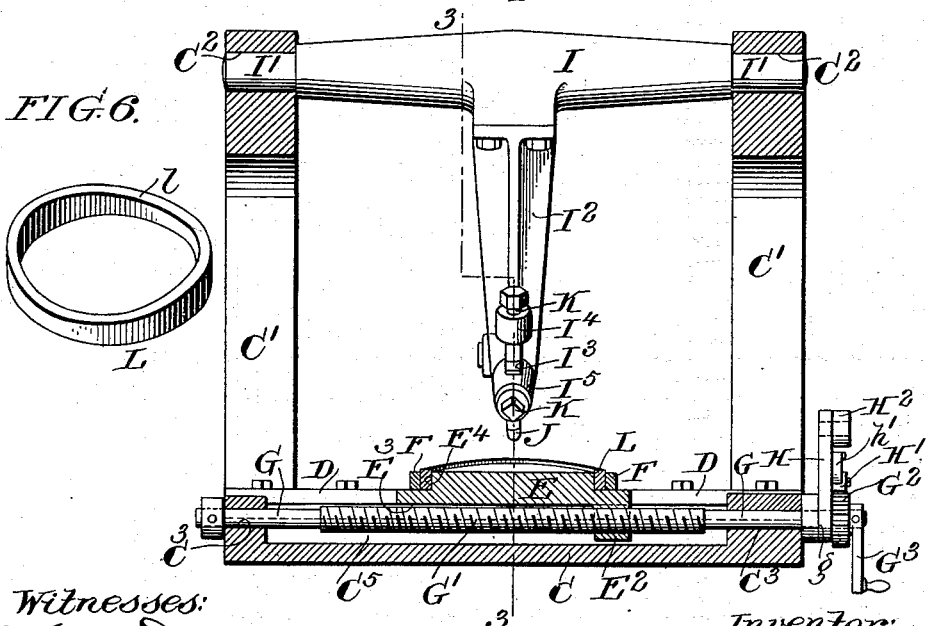
Witnesses:
Inventor:

UNITED STATES PATENT OFFICE.

BIRNEY C. BATCHELLER, OF PHILADELPHIA, PENNSYLVANIA, ASSIGNOR TO WILLIAM J. KELLY, OF SAME PLACE.

PLANING-MACHINE.

SPECIFICATION forming part of Letters Patent No. 654,935, dated July 31, 1900.

Application filed December 24, 1898. Serial No. 700,232. (No model.)

*To all whom it may concern:*

Be it known that I, BIRNEY C. BATCHELLER, a citizen of the United States of America, residing in the city and county of Philadelphia, in the State of Pennsylvania, have invented a certain new and useful Improvement in Planing-Machines, of which the following is a true and exact description, reference being had to the accompanying drawings, which form a part thereof.

My invention relates to the construction of planing-machines adapted to operate on concave cylindrical surfaces, and particularly for planing the concave cylindrical faces of annular rings—such as are used, for instance, in my receiving and transmitting apparatus of the kind described and shown in my Patent No. 595,755, of December 21, 1897.

The object of my invention is to provide simple and effective mechanism adapted to the purposes above described; and the nature of my improvements will be best understood as described in connection with the drawings in which they are illustrated, reference being now had to the drawings in which my invention is illustrated.

Figure 1:
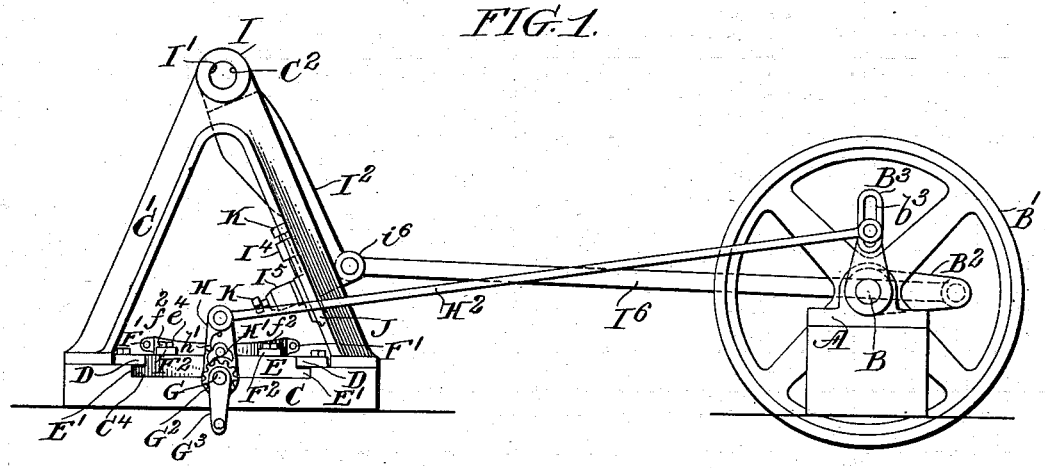
Figure 2:
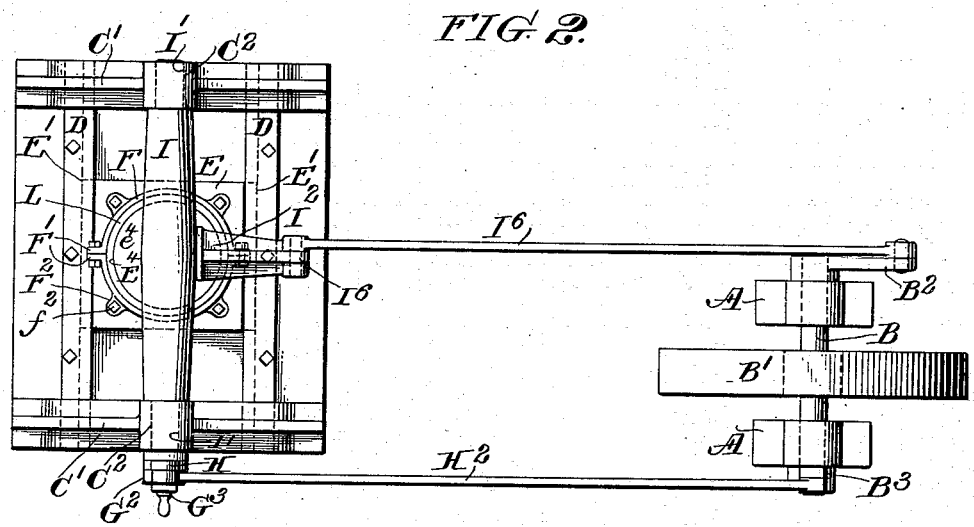

Figure 1 is a side elevation of my machine; Fig. 2, a plan thereof; Fig. 3, a side elevation of the planing-machine proper on an enlarged scale and on the section-line 3 3 of Fig. 4. Fig. 4 is an end view taken as on the section-line 4 4 of Fig. 3. Fig. 5 is a plan view of the work-holding bed and clamping-ring. Fig. 6 is a perspective view of an annular ring such as my machine is especially adapted to plane.

A A, Figs. 1 and 2, indicate bearings for the driving-shaft B, upon which, as shown, is secured the belt-wheel B' and the cranks $B^2$ and $B^3$, the crank $B^3$ being formed with a slot $b^3$, as indicated in Fig. 1.

C is the frame or bed of the planing-machine proper, at each end of which are secured upwardly-extending standards C' C', having at their upper ends bearings $C^2$ for the ends of the shaft I. The bed-plate C has formed in its opposite ends bearings $C^3$ $C^3$ and is cut away between such bearings to form the slide $C^4$ $C^4$ (best shown in Fig. 3) and the screwway $C^5$.

D D are plates bolted on the frame overhanging the slideway $C^4$.

E is a work-holding table formed with flanges E' E', which rest on the slideway $C^4$ and beneath the plates D, as shown. From the bottom of the table E extends a screw-threaded lug $E^2$, and in line therewith a recess $E^3$ is formed along the bottom of the table. From the top of the table extends a projection $E^4$, having the conformation of the inside of the ring to be planed and the top of which (indicated at $e^4$) is concavely curved, so as to clear the cutting-tool which works over the bed-plate or table.

F F are ring-segments provided with projecting ears F' F', by means of which such segments are clamped around the ring. When in place on the table, these ring-segments are formed with horizontally-projecting flanges $F^2$, by means of which they are bolted to the table, $f^2$ indicating the bolts, and it will be obvious that the ring clamped between these segments and secured by them to the table will be held absolutely immovable thereon.

G is a shaft having bearings in the frame at $C^3$ $C^3$ and formed with a feed-screw G' on its central part, which screws into the threaded lug or projection $E^2$. It will be obvious that by rotating the shaft G the table E will be fed forward or backward.

$G^2$ is a ratchet-wheel secured on the end of the shaft G, and $G^3$ a crank-arm by which the shaft can be turned.

$g$ indicates a bearing on the shaft G for the lever-arm H' and secured to it a spring $h'$, which holds the pawl in contact with the ratchet-wheel.

From the end of the lever H a link $H^2$ leads to the crank-arm $B^3$, connecting with said arm by a pin adjustable in the slot $d^3$ and the adjustment of which regulates the amount of feed—that is, the length of the stroke of the lever H—which by means of the pawl and ratchet above described rotates the shaft G.

I is a shaft, the ends I' I' of which have their bearings at $C^2$ $C^2$ in the upright standards C'. Secured to the shaft I is the arm $I^2$, which has at its lower end a tool-holding recess $I^3$ and threaded hubs or bosses $I^4$ $I^5$. The arm $I^2$ is pivotally connected at $i^6$ with a link or connecting-rod I⁶, which in turn is connected to the crank-arm B², as shown in Figs. 1 and 2.

J indicates the cutting-tool, held in the recess I⁸ by the binding and adjustment screws K K.

It will be obvious that with each revolution of the shaft B the cutting-tool is caused to make a swinging reciprocating movement over the face of the table E and that after each cutting stroke the feed-screw is rotated for the distance determined on by the adjustments described to feed the work under the reciprocating cutting-tool.

Of course any of the many well-known devices for communicating motion to the cutting-tool and feed-screw may be used in place of those illustrated and described, though these devices in simplicity and effectiveness I believe to be the best.

Having now described my invention, what I claim as new, and desire to secure by Letters Patent, is—

1. A planing-machine having in combination a tool-carrying arm pivoted at one end and provided with means for holding a tool at its free end, a shaft as B, a crank moved by said shaft, a connecting-rod, as I⁶, connecting said crank and the reciprocating arm, guides in the frame of the machine running transverse to the plane of movement of the arm aforesaid, a work-carrying table supported and movable in said guides, a feed-screw, as G', a ratchet-wheel, as G², secured to said screw, a lever, as H, pivotally connected to the shaft of screw G', a pawl H' secured on lever H in position to operate on ratchet G², a crank-arm B³ secured on shaft B at an angle of substantially ninety degrees to the crank-arm B² and a connecting-rod H² connecting crank-arm B³ and lever H as described.

2. A planing-machine having in combination a tool-carrying arm pivoted at one end and provided with means for holding a tool at its free end, a shaft, as B, a crank moved by said shaft, a connecting-rod, as I⁶, connecting said crank and the reciprocating arm, guides in the frame of the machine running transverse to the plane of movement of the arm aforesaid, a work-carrying table supported and movable in said guides, a feed-screw, as G', a ratchet-wheel, as G², secured to said screw, a lever, as H, pivotally connected to the shaft of screw G', a pawl H' secured on lever H in position to operate on ratchet G², a longitudinally-slotted crank-arm B³ secured on shaft B at an angle of substantially ninety degrees to the crank-arm B² and a connecting-rod H² having one end adjustably connected in the slot of crank-arm B³ and its other end connected to lever H.

3. In a planing-machine substantially as described a work-holding table E having a face projection E⁴ adapted to fit in a ring to be planed in combination with a clamping-ring F F and means for securing said clamping-ring to the face of the table.

BIRNEY C. BATCHELLER.

Witnesses:
CHAS. F. MYERS,
D. STEWART.